US006475981B1

(12) United States Patent
Jaeckel

(10) Patent No.: US 6,475,981 B1
(45) Date of Patent: Nov. 5, 2002

(54) FREEZING MATERIALS

(75) Inventor: Manfred Jaeckel, Loxstedt (DE)

(73) Assignee: Cognis Deutschland GmbH & Co. KG, Duesseldorf (DE)

( * ) Notice: Subject to any disclaimer, the term of this patent is extended or adjusted under 35 U.S.C. 154(b) by 0 days.

(21) Appl. No.: 09/720,997

(22) PCT Filed: Jun. 24, 1999

(86) PCT No.: PCT/EP99/04394

§ 371 (c)(1),
(2), (4) Date: Jan. 1, 2001

(87) PCT Pub. No.: WO00/01764

PCT Pub. Date: Jan. 13, 2000

(30) Foreign Application Priority Data

Jul. 3, 1998 (DE) .......................... 198 29 785

(51) Int. Cl.⁷ .............................. C11D 3/12; C11D 3/37
(52) U.S. Cl. .................. 510/475; 510/188; 510/451; 510/395; 134/8; 134/22.1; 134/22.14; 264/39
(58) Field of Search ................. 510/188, 395, 510/451, 475; 134/3, 8, 22.1, 22.14; 264/39

(56) References Cited

U.S. PATENT DOCUMENTS

| 3,862,066 A | * | 1/1975 | Reiter et al. |
| 4,491,553 A | * | 1/1985 | Yamada et al. |
| 4,838,948 A | | 6/1989 | Bailey |
| 4,954,545 A | | 9/1990 | Bailey |
| 5,238,608 A | | 8/1993 | Obama et al. |
| 6,127,458 A | * | 10/2000 | Sakai |

FOREIGN PATENT DOCUMENTS

| DE | 19 07 768 | 6/1971 |
| DE | 239 355 | 9/1986 |
| DE | 42 02 618 | 8/1992 |
| DE | 196 22 579 | 9/1997 |
| EP | 0 363 493 | 4/1990 |
| EP | 0 432 585 | 6/1991 |
| EP | 0 803 338 | 10/1997 |
| GB | 1 292 548 | 10/1972 |
| JP | 05/098072 | 10/1991 |
| WO | WO 95/17268 | 6/1995 |

* cited by examiner

*Primary Examiner*—Gregory E. Webb
(74) *Attorney, Agent, or Firm*—John E. Drach; Steven J. Trzaska

(57) ABSTRACT

A process for freezing a plastic molding machine involving: (a) providing a freezable compound containing: (i) from 20 to 45% by weight of at least one homopolymer or copolymer selected from the group consisting of an ester of methacrylic acid with a monohydric alcohol having from 1 to 4 carbon atoms, a graft polymer of an ester of methacrylic acid with a monohydric alcohol having from 1 to 4 carbon atoms, an ethylene/vinyl acetate copolymer, a graft copolymer of an ethylene/vinyl acetate copolymer, and mixtures thereof; (ii) from 45 to 75% by weight of chalk having a particle size of from 2 to 150 microns; and (iii) from 0.01 to 10% by weight of at least one freezing agent selected from the group consisting of a lubricant having a volatility of less than 0.2% by weight, a release agent having a volatility of less than 0.2% by weight, and mixtures thereof; and (b) charging the plastic molding machine with the freezable compound prior to turning of the plastic molding machine.

5 Claims, No Drawings

FREEZING MATERIALS

BACKGROUND OF THE INVENTION

This invention relates to the use of mixtures of special homopolymers and/or copolymers or graft polymers derived therefrom, chalk and lubricants and/or release agents as freezable compounds in the molding, more particularly by extrusion and injection molding, of compositions containing polyvinyl chloride.

It is known that halogen-containing plastics, more particularly polyvinyl chloride (PVC) or molding compositions produced therefrom, tend to undergo degradation or decomposition reactions when they are exposed to high temperatures. The resulting thermal stressing is problematical above all when it lasts a relatively long time. This is the case, for example, when machines for the molding of mixtures containing polyvinyl chloride are shut down, for example overnight, and then have to be started up again. Such breaks in production are quite common and normal, for example, in the case of extruders or in injection molding. The compositions still present in the machines are exposed to severe thermal stressing for long periods. Since normal processing temperatures for PVC are in the range from about 180 to 200° C. and since, in addition, the cooling of the compositions present in the machine takes place very slowly, the compositions have to be thermally stable for relatively long periods. In addition, they are expected to show certain properties, more particularly a suitable viscosity and adequate freedom from tack, when the machines mentioned are brought back into operation, i.e. started up.

JP-A-05/098072 describes compositions for cleaning machines for molding plastics. These cleaning compositions are prepared by mixing the following three components: (1) thermoplastic resin, (2) neutral salt of alkyl benzenesulfonic acid and (3) basic magnesium stearate.

U.S. Pat. No. 4,838,948 describes a process for cleaning equipment for processing polymers using a composition which contains (1) 92 to 97.4% of a polymer, (2) 2.4 to 6.4% of a mild abrasive and (3) 0.2 to 1.6% of a sulfonated surfactant. Component (1) may be inter alia an acrylic resin while component (2) is selected from the group consisting of calcium carbonate, calcium phosphate, calcium silicate and aluminium silicate.

DD-A-239355 describes a process and a cleaning composition for the rapid and efficient change of pigment in the processing of pigmented thermoplastic molding compositions, more particularly by extrusion and injection moulding. The process is carried out by displacing the pigmented residues from the extruder or the injection molding machine using fiber-reinforced thermoplastic composites. It was found to be of advantage to use a fiber-reinforced thermoplastic composite of polyamide or polyolefins containing up to 75% of chopped glass strands as a special thermoplastic molding composition. Besides these fibrous reinforcing materials, the thermoplastic molding compositions may contain up to 50% of nonfibrous inorganic additives, such as chalk, talcum, kaolin or the like.

DE-C-196 22 579 discloses compositions for cleaning machines for processing plastics, the compositions consisting of the components (1) 95 to 25% of a high molecular weight, non-thermoplastically processable polymethyl methacrylate and (2) 5 to 75% of a thermoplastically processable polymethyl methacrylate. The cleaning composition in question is present in the form of granules or a granular mixture of components (1) and (2) which is passed through the processing machine in the same way as a plastic to be processed therein. By mixing with the cleaning composition, residues of the previously processed resin are discharged from the machine. The cleaning composition is said to be particularly suitable for cleaning injection molding machines and extruders soiled with pigmented or transparent polycarbonates or polymethyl methacrylates.

WO 95/17268 describes abrasive and cleaning compositions containing (1) predominantly one or more abrasive powders, (2) at least one resin and (3) at least one copolymer of an olefin and a (meth)acrylate. In addition, the composition may contain (4) a surfactant. The abrasive (1) may be selected from a number of known compounds, including calcium carbonate. Component (2) is selected from three classes of compounds, namely: polymers of dienes, polymers of resin acids and copolymers of olefins and (meth) acrylates. A typical cleaning composition is described in Example 1: 82% of calcium carbonate, 13% of a polydiene and 5% of an ethylene/methylacrylate copolymer.

DE-A42 02 618 describes a cleaning composition for a resin molding machine containing (1) 50 to 95% of a polyolefin resin with a melt index of 0.01 to 0.5, (2) 0.1 to 15% of an acrylic copolymer, (3) 2 to 30% of a neutral salt of organic sulfonic acid and (4) 0.1 to 10% of basic magnesium carbonate, magnesium hydroxide, potassium carbonate, zinc carbonate or a mixture of two or more components thereof. The composition is said to be suitable for cleaning the molding machine whenever the various types of highly stressed plastics are changed at temperatures of around 400° C.

EP-A-803 338 describes a composition and a process for cleaning machines for processing plastics using a material based on a thermoplastic resin containing a substituted pyrrolidine solvent.

DESCRIPTION OF THE INVENTION

The problem addressed by the present invention was to provide mixtures which would be suitable for use as freezable compounds in the molding of mixtures containing polyvinyl chloride. "Freezable compounds" in the context of the invention are understood to be compositions which, before machines for molding mixtures containing polyvinyl chloride are switched off, are charged with compounds—i.e. the freezable compounds—which remain inside the machines after switch-off and are exposed to thermal stressing therein for long periods.

In particular, the freezable mixtures according to the invention would be distinguished by excellent thermal stability. Above all, they would not show any significant discoloration or increase in viscosity after prolonged thermal stressing. In addition, they would be largely tack-free.

The present invention relates to the use of mixtures containing a) 20 to 45% by weight of one or more homopolymers and/or copolymers selected from the group of esters of (meth)acrylic acid with monohydric alcohols containing 1 to 4 carbon atoms, ethylene/vinyl acetate copolymers and graft polymers based on the compounds mentioned, b) 45 to 75% by weight of chalk with particle sizes of 2 to 150 microns and c) 0.01 to 10% by weight of one or more lubricants and/or release agents with a volatility of less than 0.2% by weight (weight loss after heating in air at 190° C. for 2 hours in an open vessel), as freezable compounds in the molding of polyvinyl chloride molding compositions. The percentages mentioned for components a) to c) are percentages by weight, based on the mixture as a whole.

One or more homopolymers and/or copolymers is/are used as component a). The homopolymers and/or copolymers in question are homopolymers or copolymers based on esters of acrylic or methacrylic acid with monohydric $C_{1-4}$ alcohols as structural elements, ethylene/vinyl acetate copolymers and graft polymers based on the compounds mentioned. Component a) is used in a quantity of 20 to 45% by weight, based on the mixture as a whole. In one preferred embodiment, component a) is used in a quantity of 25 to 40% by weight and more particularly in a quantity of 30 to 35% by weight. In one most particularly preferred embodiment, component a) is selected from polymethyl and polyethyl methacrylates. Basically, the molecular weight of component a) is not critical, although it has been found that compounds with an average molecular weight (number average; Mn) in the range from 800,000 to 4,000,000 are particularly suitable. The range from 800,000 to 2,000,000 is most particularly preferred.

In one embodiment, copolymers based on esters of acrylic or methacrylic acid with methanol and/or ethanol as structural elements are used as component a). In another embodiment, component a) contains one or more ethylene/vinyl acetate copolymers in addition to the copolymers already mentioned.

Component b) is chalk (calcium carbonate) with particle sizes in the range from 2 to 150 microns. In one preferred embodiment, at least 50% by weight of the chalk used—based on the total quantity of chalk used—has particle sizes of 20 to 100 microns. This means that, in the preferred embodiment, the predominant part of the chalk may be regarded as consisting of "coarse particles". In one preferred embodiment, component b) is used in a quantity of 55 to 7%% by weight and more particularly in a quantity of 65 to 70% by weight.

The freezable mixtures to be used in accordance with the invention contain as component c) 0.01 to 10% by weight of one or more lubricants and/or release agents with a volatility of less than 2.0% by weight. In the context of the invention, volatility is defined as the weight loss which the lubricants and/or release agents used undergo after heating in air for 2 hours to 190° C. in an open vessel. The weight loss is determined simply by introducing a defined quantity of the lubricant or release agent to be tested at 20° C., subsequently heating this quantity in air to 190° C. in an open vessel and then re-determining the weight of the lubricant or release agent after cooling to 20° C. The difference between the two measurements is the weight loss attributable to the volatility of the particular substance. It is expressed in % by weight, based on the substance used, and is intended to be less than 2.0% by weight in the case of the compounds c) to be used in accordance with the invention.

It is specifically pointed out in this connection that the limit mentioned in regard to the volatility of component c) applies to all the lubricants and/or release agents present in the mixture of a) to c). This means that, in cases where several lubricants or release agents are used as component c), it is sufficient to subject the mixture of all the components used rather than each individual lubricant or release agent to the described test for weight loss by heating for 2 hours to 190° C.

In a preferred embodiment of the invention, however, each individual lubricant or release agent—where several are used as component c)—has to satisfy the above-mentioned criterion in regard to weight loss after heating for 1 hour to 190° C. However, it is important in this connection to bear in mind that the expression "individual component" as used herein is not meant to imply that, for example in the case of products based on natural raw materials, such as fatty acid esters of which the carboxylic acid units has a certain C chain distribution, each individual chemically present therein should be subjected to the weight loss test—only the technical product as such, i.e. for example a $C_{8-22}$ fatty acid stearyl ester.

In a preferred embodiment, component c) is used in a quantity of 1 to 5% by weight and more particularly in a quantity of 2.0 to 3.5% by weight.

It is expressly pointed out that both lubricants and release agents, i.e. mixtures of lubricants and release agents, may be used as component c). Release agent is the term used by the expert for products which reduce the frictional resistances predominantly between a polymer melt and the steel surface of the machine used for molding. The effect of reducing the frictional resistance is that the melt pressure is reduced. By contrast, lubricants act predominantly In the polymer melt and reduce the internal frictional forces, so that the melt—even with high filler contents—retains favorable plastic flow behavior which is important so far as the filling of the mould is concerned.

In one embodiment of the present invention, the lubricants or release agents c) used are magnesium salts and/or aluminium salts and/or zinc salts solid or liquid at 20° C. which are selected from c1) calcium salts of saturated or unsaturated, linear or branched monocarboxylic acids containing 6 to 36 carbon atoms, c2) calcium salts of unsubstituted or $C_{1-4}$-alkyl-substituted benzoic acid, c3) zinc salts of saturated or unsaturated, linear or branched monocarboxylic acids containing 6 to 36 carbon atoms, c4) magnesium salts of saturated or unsaturated, linear or branched monocarboxylic acids containing 6 to 36 carbon atoms, c5) magnesium salts of saturated or unsaturated dicarboxylic acids containing 6 to 10 carbon atoms, c6) aluminium salts of saturated or unsaturated, linear or branched monocarboxylic acids containing 6 to 36 carbon atoms.

The calcium, magnesium and aluminium salts mentioned may be used both individually and in admixture as component c).

Other lubricants which may be used individually or in combination with one another as component c) are the substances known from the relevant prior art, preferably hydrocarbon waxes melting at 70 to 130° C., oxidized polyethylene waxes, free fatty acids containing 8 to 22 carbon atoms and branched isomers thereof, for example stearic acid or hydroxystearic acid, α-olefins, wax esters, i.e. esters of relatively long-chain monocarboxylic acids and monoalcohols, primary and secondary, saturated and unsaturated higher alcohols preferably containing 16 to 44 carbon atoms in the molecule, ethylenediamine distearate, montanic acid esters of diols, for example ethanediol, butane-1,3-diol and glycerol, mixtures of such montanic acid esters with nonesterified montanic acids, partial esters of fatty acids containing 8 to 22 carbon atoms and polyols containing 2 to 6 carbon atoms and 2 to 6 hydroxyl groups and, on average, at least one free polyol hydroxyl group per molecule. The mixed esters of aliphatic, cycloaliphatic or aromatic dicarboxylic acids containing 2 to 22 carbon atoms in the molecule, aliphatic polyols containing 2 to 6 hydroxyl groups in the molecule and aliphatic monocarboxylic acids containing 12 to 30 carbon atoms in the molecule described in DE-C-19 07 768 with hydroxyl or acid values of 0 to 6 may also be used. Examples of these mixed esters are mixed esters of maleic acid/pentaerythritol/behenic acid, mixed esters of adipic acid/pentaerythritol/oleic acid and mixed esters of adipic acid/pentaerythritol/stearic acid. According to the invention, lubricants or release agents such as these may be used both individually and in combination with one another and in combination with the above-mentioned calcium, magnesium or aluminium salts.

It may be desired to use other components besides components a) to c). Examples of suitable other components are inorganic additives, such as talcum, kaolin and the like, cationic layer compounds, for example hydrotalcites or modified hydrotalcites, zeolites.

The freezable compositions to be used in accordance with the invention are generally used as follows:

In the normal operation of machines for molding PVC-containing mixtures, these mixtures are continuously fed to the machines, for example extruders. Now, if the machine is to be switched off or if production is to be interrupted, the freezable compound according to the invention is delivered to the machine rather than any more PVC-containing material. When the interior of the machine is largely and preferably completely filled with the freezable compound to be used in accordance with the invention which, therefore, has largely or completely displaced the PVC-containing material previously present, the machine is switched off. The machine may then remain switched off for a relatively long time. Basically, it does not matter when the machine is switched back on, for example after 1 hour, after 6 hours, after 24 hours or after several days or weeks. However, the main advantage of using the freezable compounds according to the invention comes into play in particular when the freezable compounds are exposed to high temperatures inside the machine for prolonged periods. This is regularly the case, for example, when the machine is shut down overnight and the temperature inside the machine and hence the temperature of the freezable compound present therein falls only slowly. When the machine is started up again, no problems are encountered. In particular, no significant increases in viscosity are likely to occur. To remove the freezable compounds according to the invention present in the machine, either PVC-containing mixtures may be directly used although it may even be desired to replace the freezable compounds present in the machine with fresh unused freezing compounds and only to change over to the PVC-containing mixtures to be processed after a certain time.

Basically, there are no restrictions in regard to the type of moulding machines in which the freezable mixtures to be used in accordance with the invention are used. However, extruders, more particularly the various commercially available single-screw and double-screw extruders, and injection molding machines are of particular importance.

EXAMPLES

Example 1

The object of the present test is to demonstrate the thermal stability of the compounds according to the invention in a hardness test. To this end, the compound corresponding to formulation 1 above is used in a twin-screw extruder commonly used in the PVC-processing industry (Battenfeld BEX 2-65-22 extruder with a Celuca profile die) after several hours production and is thermally stressed in the die for 24 hours with the heating system switched on at an operating temperature of 185° C. The next day, this severely thermally stressed material was removed from the machine with no problem whatever with the aid of non-stressed compound corresponding to formulation 1. It was found that the thermally stressed compound on the one hand showed hardly any discoloration and, on the other hand, could be removed from the extruder without any significant increase in pressure—an indication that hardly any processes which could have increased the viscosity of the compound took place during the thermal stressing phase. It is particularly worth remarking that the compound showed hardly any change of color after thermal stressing for 24 hours. This represents a considerable improvement over conventional commercially available freezable compounds which are thermally stable for only between 2 and 6 hours.

Example 2

This Example demonstrates the normal freezing procedure. The machine was first operated as normal (profile extrusion of PVC), the compound corresponding to formulation 1 was then introduced into the extruder, displacing the PVC, all the heating zones were switched off and, finally, the extruder was started up again after 24 hours, the freezable compound corresponding to formulation being used first during start up and the feed system then being switched over to PVC. It was found that, as in Example 1, no significant discoloration of the thermally stressed compound had occurred and that the thermally stressed compound was easy to remove from the machine. The rheological requirements which a freezing compound is expected to meet in the PVC-processing industry were excellently satisfied.

What is claimed is:

1. A process for freezing a plastic molding machine containing a molding mixture comprising:
    (a) providing a freezable compound containing:
        (i) from 20 to 45% by weight of at least one homopolymer or copolymer selected from the group consisting of an ester of methacrylic acid with a monohydric alcohol having from 1 to 4 carbon atoms, a graft polymer of an ester of methacrylic acid with a monohydric alcohol having from 1 to 4 carbon atoms, an ethylene/vinyl acetate copolymer, a graft copolymer of an ethylene/vinyl acetate copolymer, and mixtures thereof;
        (ii) from 45 to 75% by weight of chalk having a particle size of from 2 to 150 microns; and
        (iii) from 0.01 to 10% by weight of at least one freezing agent selected from the group consisting of a lubricant having a volatility of less than 0.2% by weight, a release agent having a volatility of less than 0.2% by weight, and mixtures thereof; and
    (b) charging the plastic molding machine with the freezable compound prior to turning off the plastic molding machine.
2. The process of claim 1 wherein the chalk has a particle size of from 20 to 100 microns.
3. The process of claim 1 wherein component (i) is a polymethyl methacrylate.
4. The process of claim 1 wherein component (i) is a polyethyl methacrylate.
5. The process of claim 1 wherein component (iii) is selected from the group consisting of a magnesium salt, an aluminum salt, a zinc salt, and mixtures thereof.

* * * * *